United States Patent [19]

Lipphardt et al.

[11] Patent Number: 5,629,538
[45] Date of Patent: May 13, 1997

[54] SEMICONDUCTOR SENSOR HAVING A PROTECTIVE LAYER

[75] Inventors: Uwe Lipphardt, Reutlingen; Guenther Findler, Pliezhausen; Horst Muenzel, Reutlingen; Helmut Baumann, Gomaringen, all of Germany

[73] Assignee: Robert Bosch GmbH, Stuttgart, Germany

[21] Appl. No.: 433,576

[22] Filed: May 3, 1995

[30] Foreign Application Priority Data

May 6, 1994 [DE] Germany ............... 44 15 984.6

[51] Int. Cl.$^6$ .................................................. H01L 29/82
[52] U.S. Cl. ............... 257/254; 257/417; 257/418; 257/419; 257/77; 73/720; 73/721; 73/726; 73/727
[58] Field of Search ................ 257/417, 418, 257/419, 420, 252, 254, 77; 73/721, 720, 719, 727, 726, 725

[56] References Cited

U.S. PATENT DOCUMENTS

| | | | |
|---|---|---|---|
| 3,819,431 | 6/1974 | Kurtz et al. | 257/419 X |
| 4,671,846 | 6/1987 | Shimbo et al. | 257/417 X |
| 5,296,730 | 3/1994 | Takano et al. | 73/727 X |
| 5,408,885 | 4/1995 | Araki | 73/727 X |

FOREIGN PATENT DOCUMENTS

| | | | |
|---|---|---|---|
| 3918769A1 | 12/1989 | Germany. | |
| 61-73382 | 4/1986 | Japan | 357/419 |

*Primary Examiner*—William Mintel
*Attorney, Agent, or Firm*—Kenyon & Kenyon

[57] ABSTRACT

A semiconductor chip, which is preferably designed as a pressure sensor, has on its rear side one or more depressions in which the pressure is measured by correspondingly designed diaphragms which are coupled to piezosensitive circuits. The surface of the depressions and, optionally, the rear side of the semiconductor chip are coated with a protective layer which ensures that the semiconductor is protected from aggressive media. The protective layer thereby makes it possible to use the sensor universally in acids, lyes or hot gases.

10 Claims, 2 Drawing Sheets

SEMICONDUCTOR SENSOR HAVING A PROTECTIVE LAYER

FIELD OF THE INVENTION

The present invention relates to semiconductor devices. More specifically, the present invention relates to a semiconductor chip having an elastically deformable diaphragm formed in the chip.

BACKGROUND INFORMATION

German Published Patent Application No. 39 18 769 A1 describes a semiconductor chip with an elastically deformable diaphragm formed therein for use in a pressure sensor. Under the influence of pressure or pressure changes, the diaphragm is deformed together with piezosensitive resistance zones in the region of the diaphragm. As a result, the piezosensitive resistance zones supply corresponding electrical signals to evaluation circuits. Such a sensor, however, can be used only in media which do not attack the silicon material. If such a sensor is introduced, for example, into acids or lyes, then the diaphragm of the silicon sensor could be etched or etched through, with the result that the diaphragm's mechanical properties are altered, thus resulting in false measured values or even complete destruction of the diaphragm.

SUMMARY OF THE INVENTION

The present invention provides a semiconductor chip having an elastically deformable diaphragm with a protective layer which is applied to a side of the diaphragm that is exposed to a medium. Unlike prior art devices, the protective layer makes it possible to use the semiconductor chip of the present invention even in aggressive media and hot corrosive vapors. Such environments occur, for example, in washing machines, in water circuits containing additives and in chemical process technology, all of which are applications in which the sensor of the present invention can be used for the measurement of pressure. Known semiconductor sensors, however, cannot be used in aggressive media.

In the semiconductor chip of the present invention, the protective layer is formed not only on the inner wall of the depression but also on the rear side of the semiconductor chip, a feature that is particularly advantageous. This means that the protective layer can be applied across the whole area without an additional masking step, resulting in cost-effective production of the protective layer. The possibility of an etching attack taking place at points of transition to the substrate, which can cause the arrangement to be damaged, is also avoided by virtue of the total covering.

When the protective layer is designed to be temperature-resistant, the semiconductor chip can be used universally as a sensor, with the result that special sensors can be dispensed with.

Materials which are resistant to acids and lyes and can be used as the protective layer are, for example, silicon carbide, carbon (C/diamond) or silicides of titanium, platinum and chromium or alternatively, to a limited extent, silicon nitride or silicon dioxide. Compounds of this type can be controlled in silicon production technology and are thus suitable for the desired use. The desired compounds can be produced in a sufficient layer thickness by the known methods, such as vapor deposition, sputtering and electrodeposition or vapor phase deposition processes (CVD processes).

Furthermore, fixing the semiconductor chips of the present invention to a suitable substrate, for example by anodic bonding, is an advantageous feature that simplifies the wafer production process. Known bonding processes, such as alloying, soldering or adhesive bonding, can also be used, so long as the materials used in the process satisfy the requirements with regard to the aggressive media.

In this way, it is possible to produce in an advantageous and cost-effective manner an actuator or a pressure sensor, for example, which has a robust structure and can be used universally.

DETAILED DESCRIPTION OF THE DRAWINGS

Figure 1A:
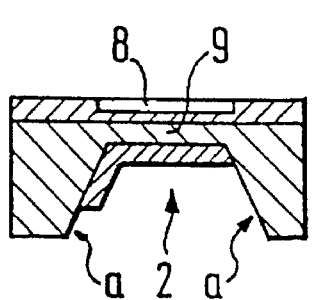
FIGS. 1(a) to 1(c) show three different semiconductor chips.
Figure 1B:
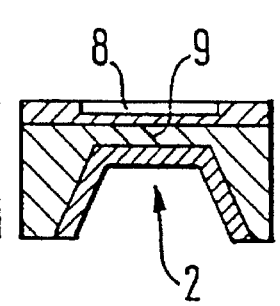
Figure 1C:
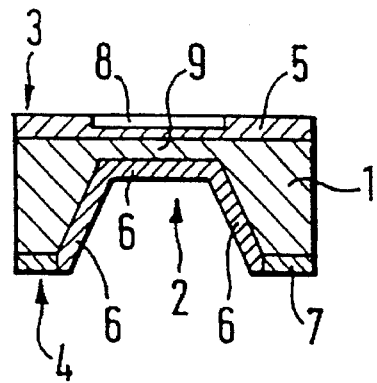

FIGS. 1(a) to 1(c) show, in cross section, three different semiconductor chips 1 cut out of a silicon wafer. The semiconductor chip 1 is designed as part of a sensor, typically a pressure sensor, and has one or more depressions 2 which were introduced from the rear side 4 of the semiconductor chip by means of a corresponding etching process. Such a production process is known per se. The three chips shown in FIG. 1 represent three different embodiments with regard to the covering of the depression 2 and the rear side 4.

The depressions 2 are distributed over the semiconductor chip 1 and are introduced to such a depth so as to leave a thin layer of silicon as a diaphragm 9. In the region of the diaphragm 9, piezosensitive resistance zones 8 are introduced which are connected to evaluation circuits on the chip via signal carrying lines (not shown). In order to protect these circuits, the front side 3 of the semiconductor chip 1 can likewise be covered with a protective layer. Under the influence of pressure or pressure changes which are present on the wall of the depressions 2, the diaphragm 9 is deformed together with the piezosensitive resistance zones 8, as a result of which the piezosensitive resistance zones 8 supply corresponding electrical signals to the evaluation circuits (not shown).

In comparison with the known prior art, the semiconductor chip 1, according to the present invention and corresponding to the embodiments shown in FIGS. 1(a) to 1(c), has a protective layer 6 which is applied completely or partially to the inner walls of the depression 2 as well as a further protective layer 7 which is optionally applied to the remaining rear side 4 of the semiconductor chip. In the three semiconductor chips shown in FIG. 1, three alternative exemplary depressions 2 are represented. In the case of the chip shown in FIG. 1(a), the depression 2 has side walls that are covered only partially or not at all in the regions a. In the case of the chip shown in FIG. 1(b), all of the inner surfaces of the depression 2 are covered. In the case of the chip shown in FIG. 1(c), all of the inner surfaces of the depression 2 are covered as well as the rear side 4.

The protective layers 6 and 7 protect the semiconductor chip 1, with the sensitive diaphragm 9, against aggressive media such as hydrofluoric acid-containing acids, lyes or hot corrosive gases. The protective layers 6 and 7 can be applied by known processes, such as vapor deposition, sputtering and electrodeposition, or the CVD (vapor phase deposition) process. Depending on the purpose of use, the protective layers can comprise, for example, a plastic gel or various metals or their silicon compounds. Titanium, platinum and chromium, for example, have proven to be worthwhile. Silicon nitride, silicon gels or silicon dioxide, polymer and silicon carbide or carbon layers are also suitable as the protective layer.

The thickness of the protective layer 6 can also influence the mechanical properties of the diaphragm 9 with the result that the thickness must also be considered in conjunction with the diaphragm thickness. Protective layers having a thickness of typically 100 to 200 nm have proven to be worthwhile at diaphragm thicknesses of, for example, typically 15 to 20 µm.

Figure 2:
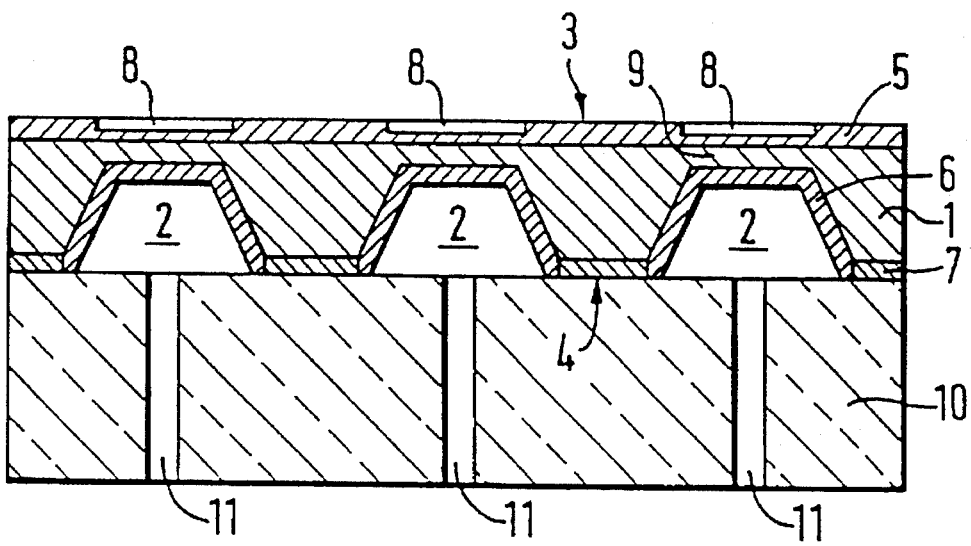
FIG. 2 shows an exemplary embodiment of a semiconductor chip in accordance with the present invention.

FIG. 2 shows an exemplary embodiment of the present invention with three depressions in one semiconductor chip 1 on a substrate 10. A plurality of process steps are necessary to apply the protective layers 6 and 7. Depending on the requirements of the application, the entire inner surface of the depression 2 or only parts thereof can be covered with the protective layer. This is correspondingly true for the lower surface or rear side 4 of the entire semiconductor wafer. Depending on the requirements of the application, corresponding masking steps are then necessary, which can generally be carried out using lithographic processes. Instead of a lithographic process, the rear side of the wafer can be vapor deposited with corresponding perforated screens, for example with platinum, with the holes in the perforated screen being aligned such that they enable vapor deposition of the depressions 2. The platinum deposited on the surface of the depression 2 is then converted in a subsequent tempering step to form platinum silicide. The further steps for producing the semiconductor chip 1 with the piezosensitive circuit arrangements are known per se and therefore need not be explained in further detail.

The semiconductor chip 1 shown in FIG. 2 can be fixed individually or as a wafer to a suitable substrate 10, for example a perforated glass plate, by means of a suitable process such as wafer bonding. Depending on the application, the semiconductor chip 1 can also be fixed to the substrate 10 by means of soldering, alloying, adhesive bonding or anodic bonding. When the semiconductor chip 1 is fixed to the substrate 10, the position of the semiconductor chip 1 or the wafer is adjusted so that each of the openings 11 of the substrate 10 aligns with a respective depression 2. The build-up of pressure in the depression 2 takes place through the openings 11, with the result that the pressure causes the diaphragm 9 to deform. It is important, therefore, that the semiconductor chip 1 be fixed to the substrate 10 across the whole area.

Figure 3:
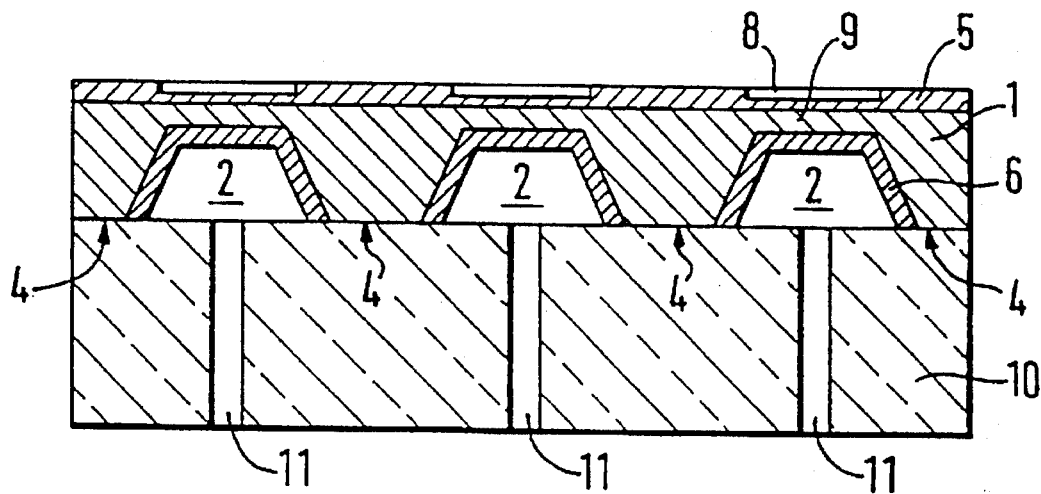
FIG. 3 shows a further exemplary embodiment of a semiconductor chip in accordance with the present invention.

FIG. 3 shows a further exemplary embodiment in accordance with the present invention, in which no protective layer 7 is applied to the rear side 4. Rather, the semiconductor chip 1 or semiconductor wafer is in this case bonded directly to the substrate 10, by, for example, an anodic bonding process.

Figure 4:
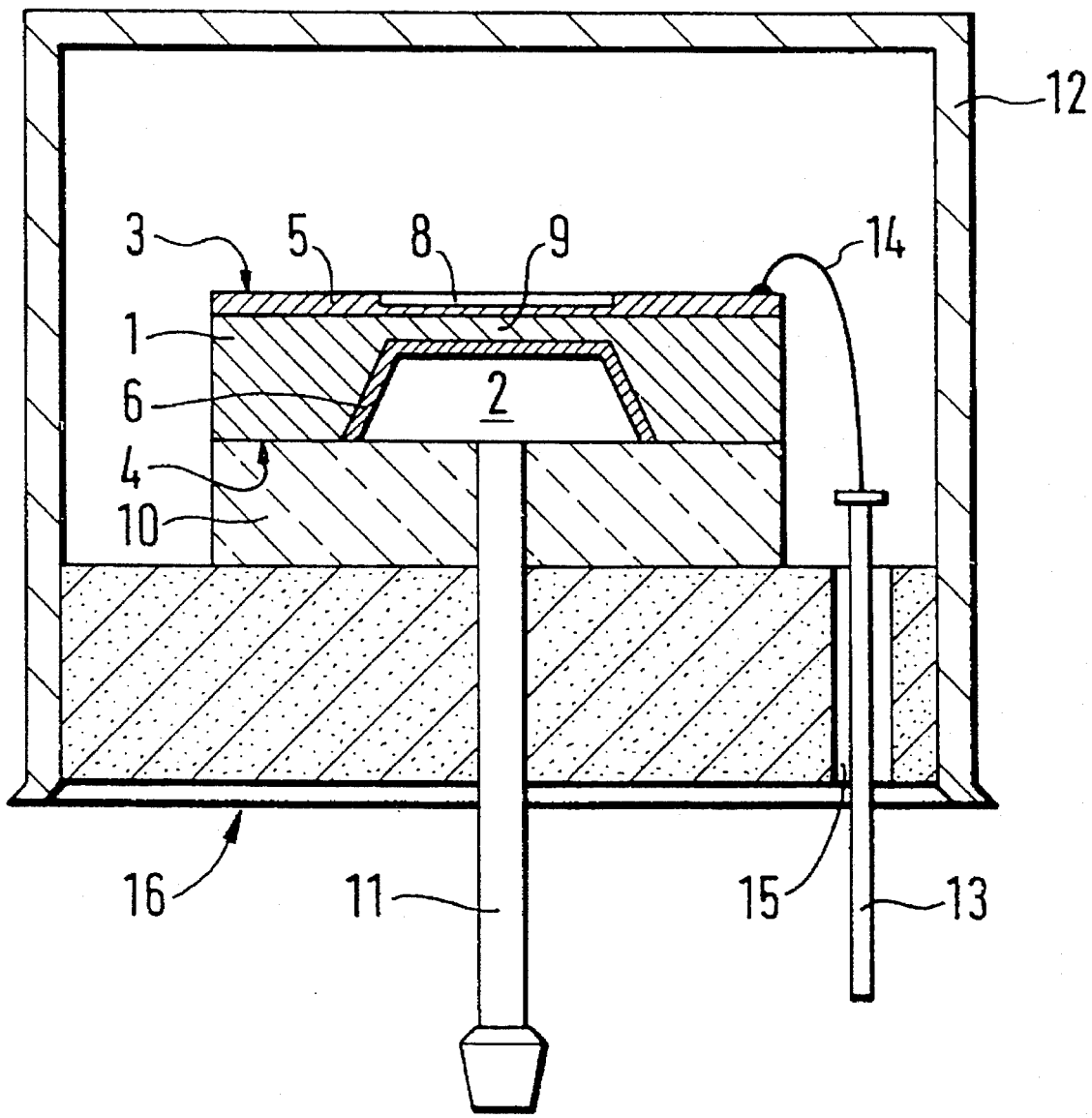
FIG. 4 shows a sensor according to the present invention packaged in a housing.

FIG. 4 shows a pressure sensor in accordance with the present invention, in which the semiconductor chip 1 is combined with the substrate 10 and incorporated in a suitable housing 16. The housing 16 is made of metal, glass or plastic and has a bushing for the pressure connection 11 to the depression 2. Furthermore, by way of illustration, one of a plurality of supply leads 13 is shown which projects into the housing 16 and which is electrically insulated from the housing 16 by insulation 15. Each supply lead 13 is connected to the integrated circuit or the resistance zones 8 by means of a bonding wire 14. For protection, the combined chip 1 and substrate 10 assembly is hermetically covered with a suitable covering 12 made, for example of metal, glass or plastic.

In a further refinement of the present invention, the semiconductor chip 1 is used as an actuator in microvalves or micropumps. In this case, the protective layers 6 and 7 can also cover other parts which come into contact with the aggressive medium.

It should be pointed out that FIGS. 1 to 4 are not to scale, with the result that in a practical implementation of the present invention, the design of the depressions 2, the diaphragm 9, the piezosensitive resistance zones 8 or the substrate 10 with the openings 11 can be correspondingly modified. In particular, the design of the depressions 2 can also be inverted. The depression 2 can thus be introduced from the front side 3, with the result that the rear side 4 of the semiconductor chip is flat. Corresponding cavities can then be provided in the substrate plate 10 to enable the build-up of pressure. The depressions 2 are then designed such that the piezosensitive circuit 8 is introduced into them. Furthermore, corresponding signal carrying leads must be provided.

What is claimed is:

1. A semiconductor chip comprising:
    a rear side with at least one depression;
    an upper wall including an elastically deformable diaphragm;
    a piezosensitive circuit arrangement, fixed to the diaphragm, for detecting a displacement of the diaphragm; and
    a silicon carbide protective layer covering the at least one depression and the rear side of the semiconductor chip, wherein rear side of the semiconductor chip is bonded to a substrate via the silicon carbide protective layer.

2. The semiconductor chip according to claim 1, wherein the protective layer is temperature resistant.

3. The semiconductor chip according to claim 1, wherein the protective layer is applied by a deposition process selected from the group consisting of a vapor deposition process, a sputtering process, an electrodeposition process, and a vapor phase deposition process (CVD process).

4. The semiconductor chip according to claim 1, wherein the diaphragm has a thicknesses of 15 to 20 µm and the protective layer has a thickness of 100 to 200 nm.

5. The semiconductor chip according to claim 1, wherein the substrate is formed of glass, and wherein the substrate includes openings which lead into the at least one depression of the semiconductor chip.

6. The semiconductor chip according to claim 5, wherein the semiconductor chip is fixed to the substrate by an anodic bonding process.

7. The semiconductor chip according to claim 5, wherein the semiconductor chip is fixed to the substrate by a bonding process selected from the group consisting of alloying, soldering and adhesive bonding.

8. The semiconductor chip according to claim 5, wherein the semiconductor chip is used in a sensor selected from the group consisting of a pressure sensor, an acceleration sensor, a mass flow sensor and a temperature sensor.

9. The semiconductor chip according to claim 5, wherein the semiconductor chip is used in an actuator selected from the group consisting of a microvalve and a micropump.

10. A pressure sensor comprising:

a semiconductor chip including
 a rear side with at least one depression,
 an upper wall including an elastically deformable diaphragm,
 a piezosensitive circuit arrangemente, fixed to the diaphragm, for detecting the displacement of the diaphragm, and
 a silicon carbide protective layer covering the at least one depression and the rear side of the semiconductor chip;

a substrate;
a protective sleeve; and
at least one electrical contact, wherein the semiconductor chip is fixed to the substrate via the silicon carbide protective layer, the protective sleeve covers the semiconductor chip, and the at least one electrical contact is coupled to the piezosensitive circuit arrangement and provides external contact to the pressure sensor.

* * * * *